United States Patent [19]
Wenning et al.

[11] Patent Number: 6,053,594
[45] Date of Patent: Apr. 25, 2000

[54] HEAT INSULATION WALL

[75] Inventors: Udo Wenning, Giengen; Jürgen Hirath, Heidenheim; Hans-Frieder Eberhardt; Ulrich Wolf, both of Giengen, all of Germany

[73] Assignee: BSH Bosch und Siemens Hausgeraete GmbH, Munich, Germany

[21] Appl. No.: 09/174,040

[22] Filed: Oct. 16, 1998

[30] Foreign Application Priority Data

Oct. 16, 1997 [DE] Germany ............................ 197 45 827

[51] Int. Cl.$^7$ .................................................. A47B 96/04

[52] U.S. Cl. ............................ 312/400; 52/788.1; 428/69

[58] Field of Search ..................................... 312/400, 406, 312/406.1, 409; 428/69, 75, 76; 62/45.1, DIG. 13, 907, 440, 465; 220/592.27, 560.12, 560.1; 445/70, 73; 215/13.1; 105/357; 52/788.1, 800.1

[56] References Cited

U.S. PATENT DOCUMENTS

| | | | |
|---|---|---|---|
| 2,679,944 | 6/1954 | Morton | 62/DIG. 13 |
| 2,708,774 | 5/1955 | Seelen | 52/788.1 |

*Primary Examiner*—Peter M. Cuomo
*Assistant Examiner*—Jerry A. Anderson
*Attorney, Agent, or Firm*—Herbert L. Lerner; Laurence A. Greenberg; Werner H. Stemer

[57] ABSTRACT

The heat insulation wall is a sandwich formed by two outer, at least substantially vacuum-tight, spaced-apart surface layers and a thermal insulation in between. The outer surface layers are connected to one another in vacuum-tight fashion by a connecting profile that extends along their contour. The connecting profile has an essentially U-shaped cross section and it is composed of a plurality of profile sections. The connecting profile and the surface layers together enclosing an evacuable space that is filled with the evacuable thermal insulation material. The profile sections of the connecting profile include corner sections which enclose the corners of the heat insulation wall in one-piece form.

9 Claims, 2 Drawing Sheets

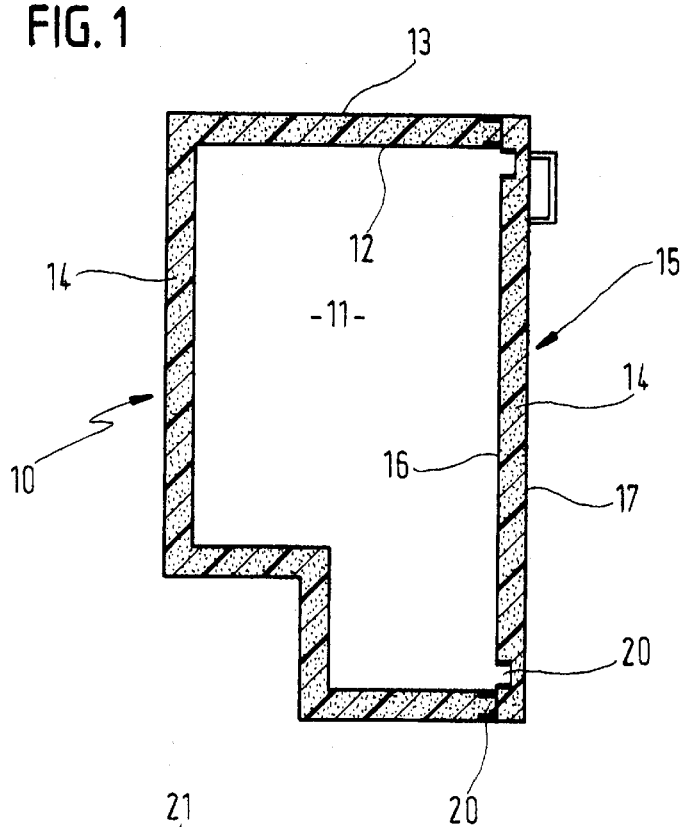
FIG. 1
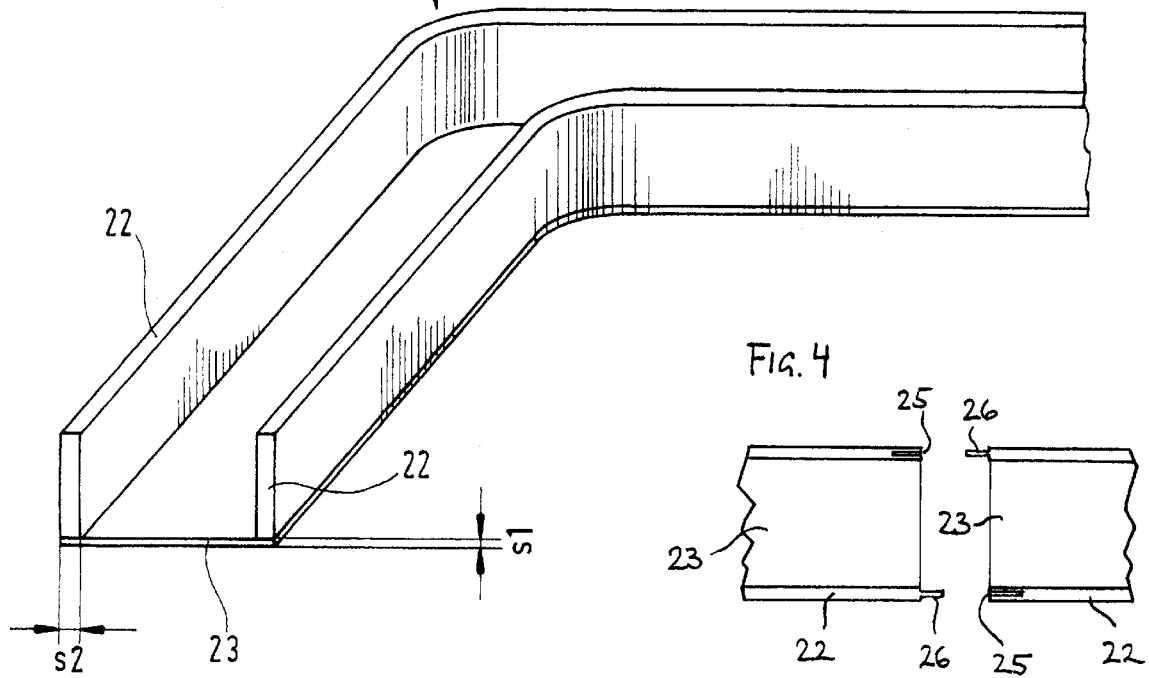
FIG. 3
FIG. 4

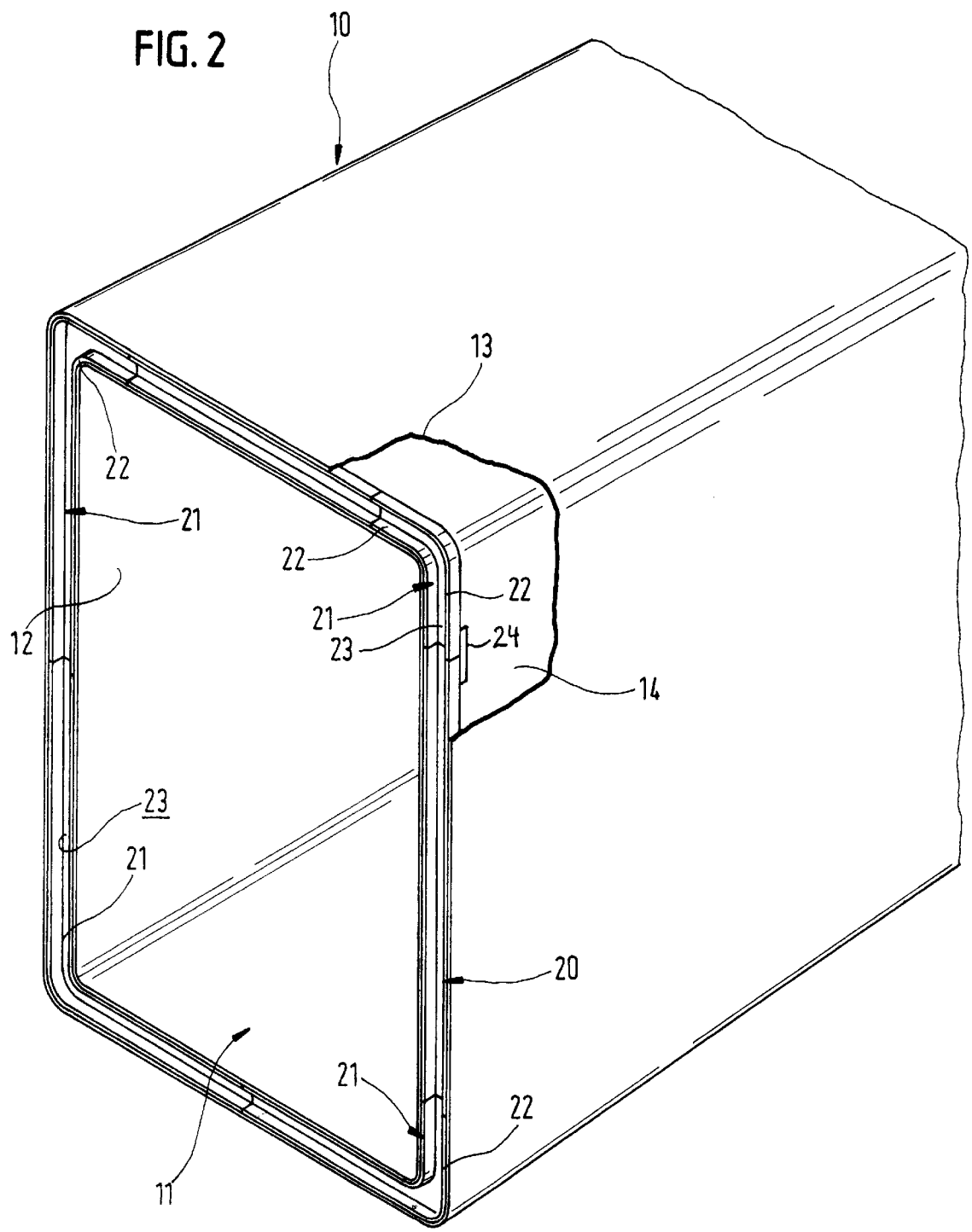

HEAT INSULATION WALL

BACKGROUND OF THE INVENTION

Field of the Invention

The invention relates to temperature insulation. More specifically, the invention pertains to a heat insulation wall with two outer, at least essentially vacuum-tight, mutually spaced-apart surface layers, connected to one another in vacuum-tight fashion by a connecting profile which extends along their contour. The profile is essentially U-shaped in cross section and is composed of a plurality of profile sections. The surface layers together with the connecting profile enclose an evacuable space which is filled with evacuable thermal insulation material.

It is customary in the context prior art heat insulation walls based on vacuum technology, especially in housings for refrigeration devices, for the connecting profile connecting the two surface layers of the heat insulation wall or housing to be composed of a plurality of profile sections which form a joint in the corner region of the walls or housing, respectively. The profile sections are joined to one another at the joint site, usually in a miter joint or butted, and they are welded to one another in vacuum-tight fashion. In such joints in the corner region it may well be the case that not only is the joint site extremely difficult to weld because of too large a gap owing to the production tolerances of the individual profile sections but also the angularity is ensured by the joint site in the corner region only if complicated tensioning measures are employed when joining the individual profile sections. In addition, there may be an accumulation of weld seams in the corner region.

SUMMARY OF THE INVENTION

It is accordingly an object of the invention to provide a heat insulation wall, which overcomes the disadvantages of the heretofore-known devices and methods of this general type and which is provided with a connecting profile that avoids the disadvantages otherwise associated with the corners of the heat insulation wall.

With the foregoing and other objects in view there is provided, in accordance with the invention, a heat insulation wall, comprising:

two outer, substantially vacuum-tight, mutually spaced-apart surface layers having an outer contour with corners; and a connecting profile connecting the two outer surface layers to one another in vacuum-tight fashion along the outer contour, the surface layers together with the connecting profile enclosing an evacuable space filled with thermal insulation material, the connecting profile being formed with a plurality of profile sections including corner sections extending in one piece over the corners of the outer contour.

In other words, the above objects are satisfied with the corner sections of the profile that extend in one-piece form about the corners of the heat insulation wall.

By virtue of the novel design of the profile sections, the sections extend jointlessly over the corner regions of the heat insulation wall or housing so that in the case of heat insulation walls and housings whose surface layers and the connecting profile connecting the surface layers are manufactured, for example, from stainless steel sheet the problem of additional accumulations of weld seams, giving rise to potential problems with the leaktightness of the vacuum insulation, is rendered less acute. The provision of the one-piece corner profiles also ensures that the desired geometry, which is also required for functional reasons, is reliably maintained, since the corner profiles can be employed as preformed or prefabricated components and the corner need not be formed by profile sections which are not joined together until the manufacturing stage. Furthermore, the corner profiles can be designed with different profiling, such as, for example, as rounded corners, which permit a constant, uninterrupted, continuous and thus reliable—in processing terms—welding operation when the surface layers are welded to the connecting profile.

In accordance with an added feature of the invention, the connecting profile has a substantially U-shaped cross section, and the corner sections are formed by reshaping substantially vacuum-tight, sheet material.

The use of sheet-like material for producing the profile sections is a simple means of minimizing thermal conduction between the surface layers, which are exposed to different temperature levels, with the possibility—using stainless steel sheet for the surface layers and/or a stainless steel plate for the corner profiles and employing welding techniques, such as laser beam welding, microplasma welding or the like—of producing mass production compatible, vacuum-tight heat insulation walls and housings in a particularly simple manner.

In accordance with an alternative feature of the invention, the connecting profile is U-shaped with a base, and the corner sections are formed of a plurality of at least substantially vacuum-tight profile section elements including an element forming the base, the element forming the base being formed from sheet material.

Corner profiles constructed in this way from metal-coated or laminated plastics, for example, offer the possibility, given the low thermal conductivity occasioned by the sheet-like design of the base, of giving the legs of the corner profiles a much greater material thickness than the base, thereby allowing, for example, a welding operation to the surface layers—for example, also metal-coated or laminated plastic plates—to be carried out with much greater ease and at a substantially higher processing speed.

In accordance with an additional feature of the invention, the profile section elements of the profile sections are welded to one another. The profile section elements of the profile sections can be connected to one another in vacuum-tight fashion with particular simplicity and reliability and in mass-produced quantities.

In accordance with another feature of the invention, the profile sections and the surface layers are formed from weldable metallic materials. The vacuum which brings about the heat insulation effect of the heat insulation walls and housings, respectively, can be maintained in a particularly reliable manner and with long-term stability if the profile sections are formed from weldable metallic materials.

In accordance with again an added feature of the invention, support elements fastened to the surface layers support the profile sections at connecting joints thereof. As a result, the profile sections are arranged at at least approximately the same height relative to one another at their connecting points. The support elements additionally facilitate the placing and exertion of force of tensioning tools which tension the profile sections with the surface layers. The support elements also enable, furthermore, a particularly reliable, vacuum-tight weld to be obtained between the profile sections.

In accordance with again an additional feature of the invention, the profile sections are formed from elements including a base and legs of the U-shaped cross-section, and wherein the legs of respective sections are joined to one another in a tongue-and-groove connection.

By designing the profile sections in this way they can be connected at their legs in vacuum-tight fashion and with particular reliability to the surface layers by means, for example, of welding. Likewise, profile sections designed in this way permit a positive bond with one another which acts perpendicularly to their direction of connection and which not only permits simpler height positioning of the profile sections when they are connected to the surface layers but also substantially improves the shape stability of the connecting profile that is composed of the profile sections, especially at the connecting points. This embodiment also enables a weld seam to be routed continuously along the contour of the surface layers.

With the above and other objects in view there is also provided, in accordance with the invention, a refrigeration device, comprising: a heat insulated housing formed of heat insulation walls according to the foregoing description, and a heat insulated door pivotally supported on the housing. The door is also formed of a heat insulation wall as described above. Such a refrigeration device is particularly reliable in processing terms and favorable in manufacturing terms. Also, a refrigeration device of this kind can be produced so as to be recyclable in a particularly environment-friendly manner.

Similarly, a household stove having a stove muffle with heat insulating walls as described can be produced in a manner which is particularly reliable in processing terms and favorable in manufacturing terms, and can be disposed of in an environmentally friendly manner.

Other features which are considered as characteristic for the invention are set forth in the appended claims.

Although the invention is illustrated and described herein as embodied in a heat insulation wall, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a simplified diagrammatic lateral section of a housing of a domestic refrigeration device with a door that, like the housing, is composed of two mutually spaced-apart surface layers connected by a connecting profile composed of sections;

FIG. 2 is a perspective view of the housing with the connecting profile that connects its surface layers and whose profile sections in the corner region of the housing are in one-piece configuration;

FIG. 3 is a perspective view of a one-piece profile section used in the corner region of the housing; and FIG. 4 is a simplified diagrammatic plan view of a tongue and groove connection of the profile segments.

DESCRIPTION OF THE PREFERRED EMBODIMENTS

Referring now to the figures of the drawing in detail and first, particularly, to the simplified diagrammatic representation of FIG. 1, there is seen a heat insulation housing 10 which is suitable for use as a domestic refrigeration device, such as a household refrigerator or home freezer. The interior, serving as a storage compartment 11, is lined with a surface layer 12 in the form of an internal lining and produced by noncut shaping: for example, a plate of stainless steel sheet or a plate of corrosion-protected steel sheet. At a distance from the inner surface layer 12, the housing 10 has an outer surface layer 13, serving as an exterior lining, which is formed without cutting from the same material as the interior lining. An evacuable thermal insulation material 14 is accommodated between the surface layers 13 and 12. The material 14 supports the two surface layers relative to one another and consists, for example, of open-cell slabstock polyurethane foam or polystyrene foam. Also furnished with such thermal insulation material 14 is a door 15 serving to close the storage compartment 11. The door 15 is pivotally mounted on the housing 10 and it is formed, similarly to the housing 10, from an inner surface layer 16 and, at a spacing distance from it, an outer surface layer 17. The two spaced-apart layers 16 and 17 are supported relative to one another by the thermal insulation material 14. Both the surface layers 16 and 17 of the door 15 and the surface layers 12 and 13 used to form the housing 10 are each connected to one another in vacuum-tight fashion by a connecting profile 20. Together with the connecting profile 20, the surface layers 12 and 13 and 16 and 17, respectively, delimit an evacuable space which is filled with the thermal insulation material that supports the surface layers 12 and 13 and 16 and 17, respectively, during evacuation.

The design of the connecting profile 20 is explained below with reference to the exemplary embodiment of the housing 10 depicted in more detail in FIG. 2.

As evident in particular from FIG. 2, the connecting profile 20, which is U-shaped in cross section, has profile sections some of which are straight and some of which are angled and which in the assembled state form a closed frame corresponding respectively to the cross section of the housing 10 and to the door geometry. From the profile sections there extend the profile sections 21, provided in the corners of the housing 10, continuously without any joint over the corner region of the housing 10, the free ends of the corner profile sections 21 being joined in vacuum-tight fashion either with one another or via straight profile sections to form a joint. Like the straight profile sections, the corner profile sections 21 are composed of individual profile section elements formed on the one hand by their legs 22 and on the other hand by their base 23 which connects the legs 22.

In a preferred embodiment of the invention, the profile sections 21, 20 rest on support elements 24 that are fastened to the surface layers 12, 13. The support elements 24 support the profile sections at connecting joints thereof.

As shown by FIG. 3, the base 23 of the profile sections of U-shaped cross section is manufactured from a one-piece material blank produced, for example, from a stainless steel plate, and is furnished with a wall thickness sl which, in order to minimize thermal conduction, is much less than the thickness s2 of the material of the legs 22 which are formed without cutting from, for example, a strip of stainless steel sheet. The legs 22 are connected in vacuum-tight fashion to the base 23—for example, by laser welding or microplasma welding—and serve to fix the connecting profile 20 to the surface layers 12 and 13 and 16 and 17, respectively, which are manufactured, for example, from stainless steel sheet.

The connecting profile 20 is fixed to the surface layers 12 and 13 by inserted between the latter such that the legs 22 of the profile sections bear with their outside against the insides of the surface layers 12 and 13, the free ends of the legs 22 finishing essentially flush with the free ends of the surface layers 12 and 13. To obtain a vacuum-tight bond between the surface layers 12 and 13 and the legs 22, the surface layers 12 and 13 are connected to one another in vacuum-tight fashion along the legs 23 by means, for example, of electron beam welding or microplasma welding (in this context see FIG. 2).

The connecting profile 20, described on the basis of the example of the housing 10 and composed of jointless corner profile sections 21, can be applied analogously to the vacuum-tight connection of the surface layers 16 and 17 to the door 15, the surface layers 16 and 17 of the door 15 being shaped appropriately in accordance with whether the point of connection are to be configured, for example, as a corner joint or lap joint. For use of the connecting profile 20 with the door 15, the former should be provided on the storage-compartment side of the door 15 in order to prevent thermal conduction from the inner surface layer 16 to the outer surface layer 17.

In addition to the use of the connecting profile 20 to connect the inner and outer surface layers of a housing 10 or of a door 15, the connecting profile 20 is of course also suitable for forming a vacuum-tight bond of a vacuum-insulated oven muffle composed of an outer surface layer and an inner surface layer, in which case, in contradistinction to the housing 10 or to the door 15, the space resulting between the surface layers of the oven muffle is filled, to support the surface layers, with a thermal insulation material adapted to the service temperatures prevailing in the stove muffle.

Deviating from the proposed attachment of the connecting profile 20 to the housing 10 it is also possible to configure the connecting profile such that the legs engage with the outsides of the surface layers 12 and 13 and 16 and 17, respectively.

With reference to FIG. 4, the legs 22 of the U-shaped cross-sectional profiles 21, 20 may be joined to one another in a tongue-and-groove connection. Easy assembly is possible where one of the legs 22 is formed with a groove 25 and the other leg 22 is formed with a corresponding feather tongue 26.

We claim:

1. A heat insulation wall, comprising:
   two outer, substantially vacuum-tight, mutually spaced-apart surface layers having an outer contour with corners; and
   a connecting profile connecting said two outer surface layers to one another in vacuum-tight fashion along said outer contour, said surface layers together with said connecting profile enclosing an evacuable space filled with thermal insulation material, said connecting profile being formed with a plurality of profile sections including corner sections extending in one piece over corners of said outer contour.

2. The heat insulation wall according to claim 1, wherein said connecting profile has a substantially U-shaped cross section, and said corner sections are formed by reshaping substantially vacuum-tight, sheet material.

3. The heat insulation wall according to claim 1, wherein said connecting profile has a substantially U-shaped cross section with a base, and said corner sections are formed of a plurality of at least substantially vacuum-tight profile section elements including an element forming said base, said element forming said base being formed from sheet material.

4. The heat insulation wall according to claim 3, wherein said profile section elements of said profile sections are welded to one another.

5. The heat insulation wall according to claim 1, wherein said profile sections and said surface layers are formed from weldable metallic materials.

6. The heat insulation wall according to claim 1, which further comprises support elements fastened to said surface layers for supporting said profile sections at connecting joints thereof.

7. A household stove, comprising: a heat-insulating stove muffle formed with heat insulation walls according to claim 1.

8. A refrigeration device, comprising: a heat insulated housing formed of heat insulation walls according to claim 1, and a heat insulated door pivotally supported on said housing, said door being formed of a heat insulation wall according to claim 1.

9. A heat insulation wall, comprising:
   two outer, substantially vacuum-tight, mutually spaced-apart surface layers having an outer contour with corners; and
   a connecting profile having a substantially U-shaped cross section and connecting said two outer surface layers to one another in vacuum-tight fashion along said outer contour, said surface layers together with said connecting profile enclosing an evacuable space filled with thermal insulation material, said connecting profile being formed with a plurality of profile sections including corner sections extending in one piece over the corners of said outer contour, said profile sections being formed from elements including a base and legs of said U-shaped cross-section, and said legs of respective sections being joined to one another in a tongue-and-groove connection.

* * * * *